United States Patent
Tysowski

(10) Patent No.: US 7,885,641 B2
(45) Date of Patent: Feb. 8, 2011

(54) METHOD AND SYSTEM FOR USING SUBJECTS IN INSTANT MESSAGING SESSIONS ON A MOBILE DEVICE

(75) Inventor: Piotr Konrad Tysowski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 818 days.

(21) Appl. No.: 11/764,544

(22) Filed: Jun. 18, 2007

(65) Prior Publication Data

US 2008/0311935 A1 Dec. 18, 2008

(51) Int. Cl.
*H04L 12/58* (2006.01)
(52) U.S. Cl. .............. 455/412.1; 455/466; 455/566; 455/414.1
(58) Field of Classification Search ............ 455/412.1, 455/413, 466, 566, 414.1; 709/206, 207, 709/204, 345, 219, 223; 715/772, 743, 758, 715/859, 764
See application file for complete search history.

(56) References Cited

U.S. PATENT DOCUMENTS

| | | | |
|---|---|---|---|
| 2003/0131055 A1 | 7/2003 | Yashchin et al. | |
| 2005/0149621 A1 | 7/2005 | Kirkland et al. | |
| 2005/0262199 A1 | 11/2005 | Chen et al. | |
| 2006/0059235 A1* | 3/2006 | Peterson et al. | 709/206 |
| 2006/0075029 A1* | 4/2006 | Kelso et al. | 709/206 |
| 2006/0248150 A1 | 11/2006 | Chaar et al. | |

OTHER PUBLICATIONS

European Search Report for application No. EP 07 11 0495, Oct. 17, 2007.

* cited by examiner

*Primary Examiner*—Jean A Gelin
(74) *Attorney, Agent, or Firm*—Blake, Cassels & Graydon LLP; Wilfred P. So; Brett J. Slaney

(57) ABSTRACT

A system and method are provided that incorporate subjects or subject lines into instant messaging sessions or conversations on a mobile device. During an instant messaging session, the user is provided with an option to specify a subject for at least the current portion of the session or for the entire session. The subject is proposed to the other users in the session, who can accept, ignore or modify the subject at their end. Multiple subjects can be specified for a single conversation if desired, and the subjects can be displayed with the contact in a message list. The instant messaging sessions may then be searched using search tools that are typically used for search email and other data messages.

20 Claims, 14 Drawing Sheets

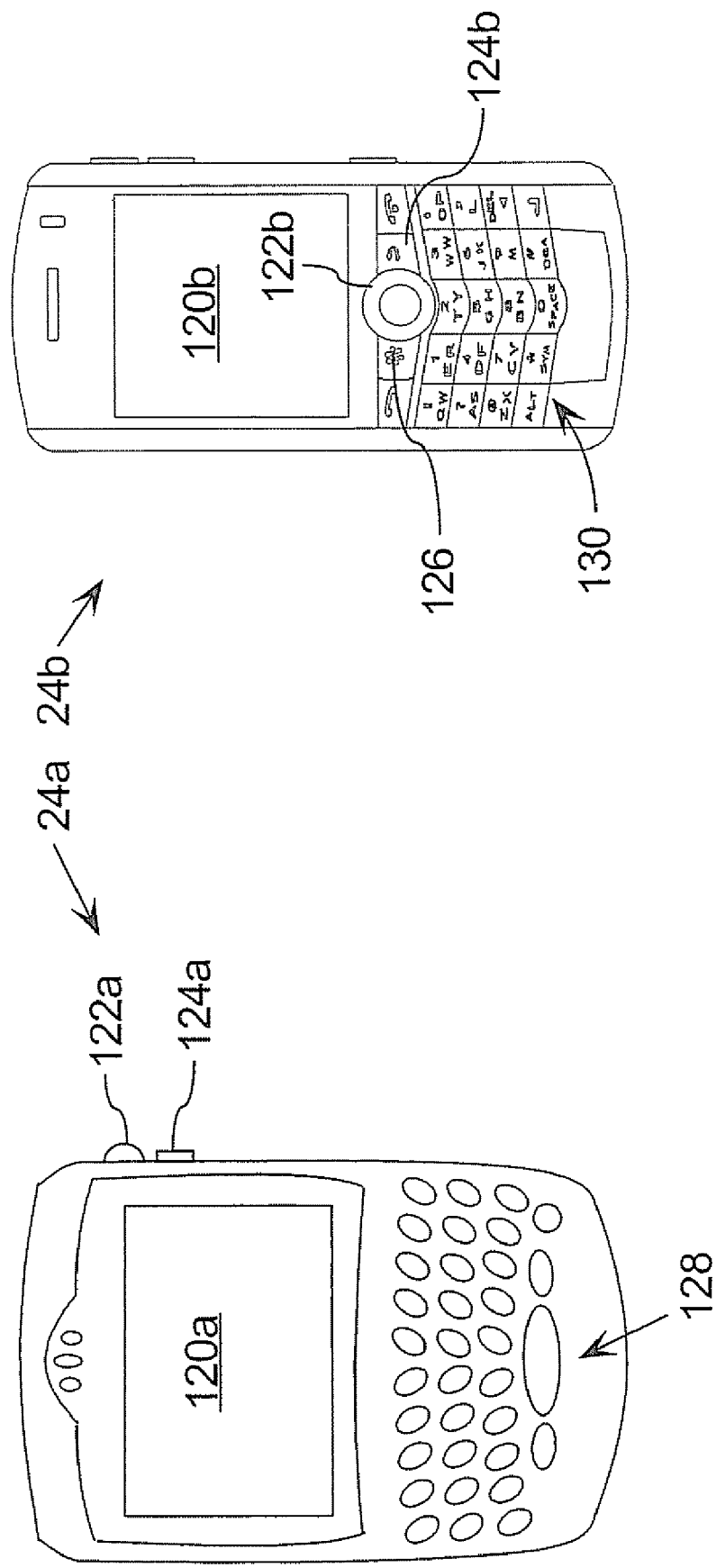

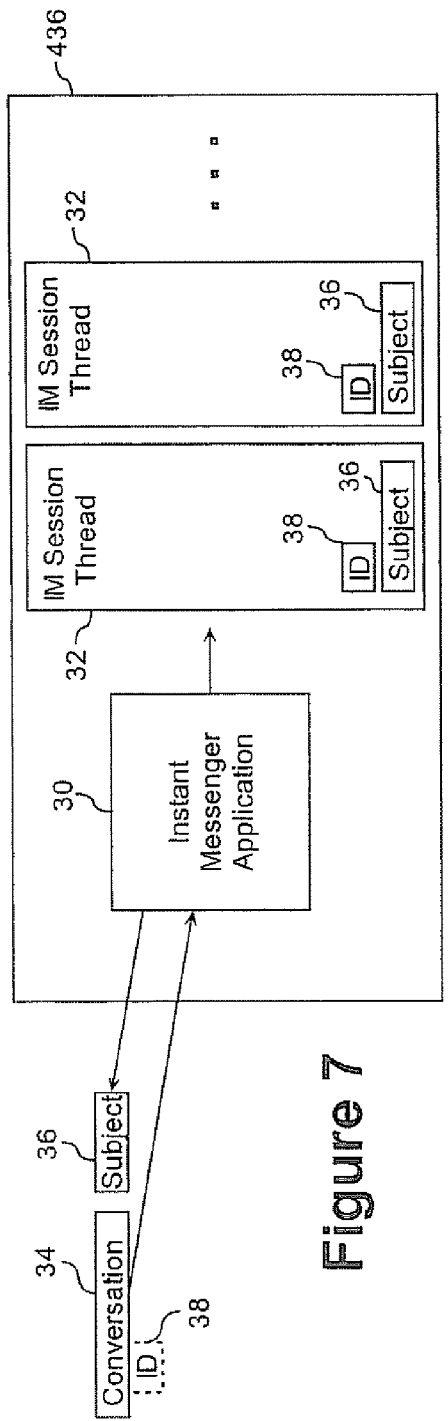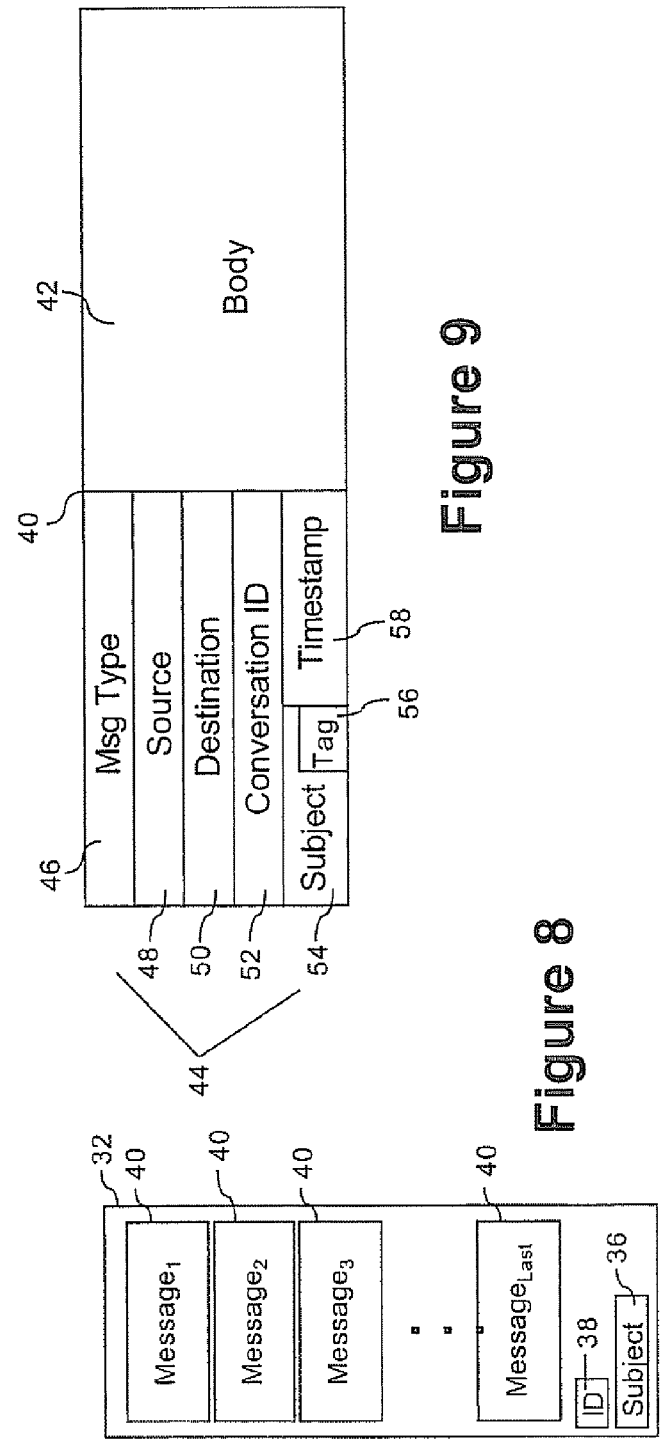

METHOD AND SYSTEM FOR USING SUBJECTS IN INSTANT MESSAGING SESSIONS ON A MOBILE DEVICE

TECHNICAL FIELD

The following relates to systems and methods for using topics in instant messaging sessions on a mobile device.

DESCRIPTION OF THE PRIOR ART

Mobile devices that are capable of sending and receiving data such as emails and text messages may also be used for instant messaging. Instant messaging sessions or 'conversations' are typically stored on the mobile device as a collective series of exchanged messages so that the user can later continue the session and/or review the history of the conversation.

In current instant messaging applications, each conversation is displayed on the mobile device with the most recent message appearing as the title of the conversation. Since each conversation can contain many messages covering various topics, the most recent message is not necessarily representative of the conversation or any topic covered therein. For example, the last message may read "I will talk to you tomorrow", which may in fact be a closing message for several conversations with the same contact.

In order to differentiate between conversations, especially those from several days prior, users often have to trace back through individual messages. On a mobile device, where the display area is typically limited, this can be time consuming and frustrating. In order to find the right conversation, the user also typically has to remember the parties involved and the approximate time of the message exchange in order to search through the correct reference to find the conversation of interest, which can be a lot to remember.

It is therefore an object of the following to obviate or mitigate at least one of the above disadvantages.

BRIEF DESCRIPTION OF THE DRAWINGS

Embodiments will now be described by way of example only with reference to the appended drawings wherein:

FIG. 1 is a schematic diagram of a mobile device and a display screen therefor.

FIG. 2 is a schematic diagram of another mobile device and a display screen therefor.

FIG. 7 is a schematic block diagram showing details of the instant messaging program shown in FIG. 4.

FIG. 8 is a schematic block diagram of an instant messaging thread shown in FIG. 7.

FIG. 9 is a schematic block diagram of a message shown in FIG. 8.

DETAILED DESCRIPTION OF THE DRAWINGS

Example Mobile Device

Figure 3:
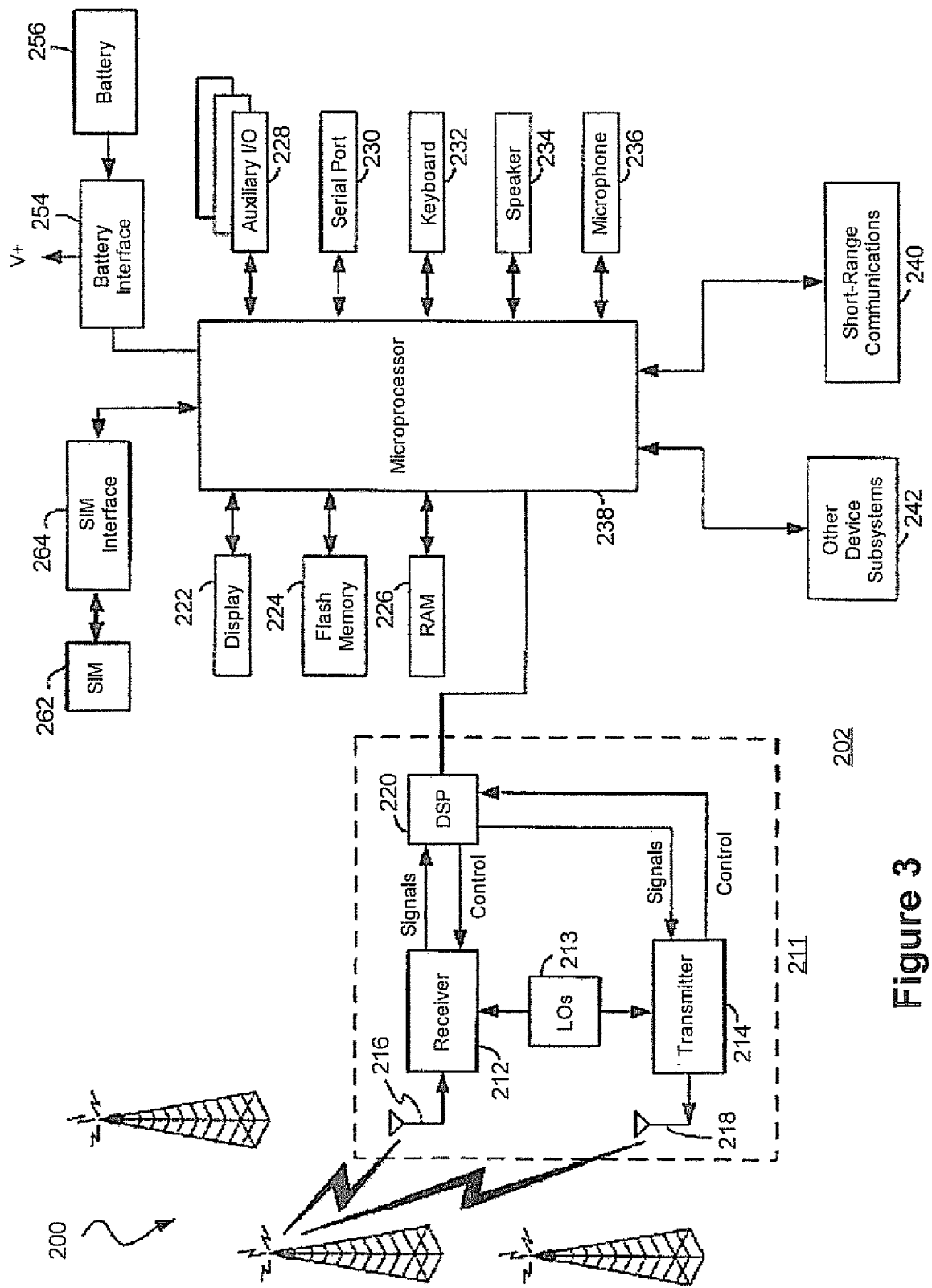
FIG. 3 is a schematic block diagram of components of the mobile device of any or both of FIGS. 1 and 2.

Referring now to FIGS. 1 and 2, one embodiment of a mobile device 24*a* is shown in FIG. 1, and another embodiment of a mobile device 24*b* is shown in FIG. 2. It will be appreciated that the numeral "24" will hereinafter refer to any mobile device 24, including the embodiments 24*a* and 24*b*. It will also be appreciated that a similar numbering convention may be used for other general features common between FIGS. 1 and 2 such as a display 120, a positioning device 122, and a cancel or escape button 124.

The mobile device 24*a* shown in FIG. 1 comprises a display 120*a* and the cursor or view positioning device 122 shown in this embodiment is a positioning wheel 122*a*. Positioning device 122 may serve as another input member and is both rotatable to provide selection inputs to the processor 238 (see FIG. 3) and can also be pressed in a direction generally toward housing to provide another selection input to the processor 238. The display 120 may include a selection cursor 132 (see FIG. 5) that depicts generally where the next input or selection will be received. The selection cursor 132 may comprise a box, alteration of an icon or any combination of features that enable the user to identify the currently chosen icon or item. The mobile device 24*a* in FIG. 1 also comprises an escape or cancel button 124*a* and a keyboard 128. In this example, the keyboard 128 is disposed on the front face of the mobile device housing and positioning device 122 and cancel button 124*a* are disposed at the side of the housing to enable a user to manoeuvre the scroll wheel 122*a* while holding the mobile device 24 in one hand. The keyboard 128 is in this embodiment a standard QWERTY keyboard.

The mobile device 24*b* shown in FIG. 2 comprises a display 120*b* and the positioning device 122 in this embodiment is a trackball 122*b*. Trackball 122*b* permits multi-directional positioning of the selection cursor 132 such that the selection cursor 132 can be moved in an upward direction, in a downward direction and, if desired and/or permitted, in any diagonal direction. The trackball 122*b* is preferably situated on the front face of a housing for mobile device 24*b* as shown in FIG. 2 to enable a user to manoeuvre the trackball 122*b* while holding the mobile device 24*b* in one hand. The trackball 122*b* may serve as another input member (in addition to a directional or positioning member) to provide selection inputs to the processor 238 and can preferably be pressed in a direction towards the housing of the mobile device 24*b* to provide such a selection input.

The mobile device 24*b* also comprises a menu or option button 126 that loads a menu or list of options on display 120*b* when pressed, and a cancel or escape button 124*b* to exit, "go back" or otherwise escape from a feature, option, selection or display. The mobile device 24*b* as illustrated in FIG. 2, comprises a reduced QWERTY keyboard 130. In this embodiment, the keyboard 130, positioning device 122, escape button 124*b* and menu button 126 are disposed on a front face of a mobile device housing.

The reduced QWERTY keyboard 130 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 24, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 24 etc.), or other whether presently known or unknown may be employed. Similarly, any variation of keyboard 128, 130 may be used. It will also be appreciated that the mobile devices 24 shown in FIGS. 1 and 2 are for illustrative purposes only and various other mobile devices 24, presently known or unknown are equally applicable to the following examples.

FIG. 3 is a detailed block diagram of a preferred mobile station 202 of the present disclosure. The term "mobile station" will herein refer to the operable components of, e.g. mobile device 24. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities)—e.g. mobile device 24 shown in FIGS. 1 and 2. Mobile station 202 may communicate with any one of a plurality of fixed transceiver stations 200 within its geographic coverage area.

Mobile station 202 will normally incorporate a communication subsystem 211 which includes a receiver 212, a transmitter 214, and associated components such as one or more (preferably embedded or internal) antenna elements 216 and 218, local oscillators (LOs) 213, and a processing module such as a digital signal processor (DSP) 220. As will be apparent to those skilled in field of communications, particular design of communication subsystem 211 depends on the communication network in which mobile station 202 is intended to operate.

Mobile station 202 may send and receive communication signals over a network after required network registration or activation procedures have been completed. Signals received by antenna 216 through the network are input to receiver 212, which may perform such common receiver functions as signal amplification, frequency down conversion, filtering, channel selection, and like, and in example shown in FIG. 3, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202. In one embodiment, mobile station 202 uses a Subscriber Identity Module or "SIM" card 262 to be inserted in a SIM interface 264 in order to operate in the network. SIM 262 is one type of a conventional "smart card" used to identify an end user (or subscriber) of the mobile station 202 and to personalize the device, among other things. Without SIM 262, the mobile station terminal in such an embodiment is not fully operational for communication through a wireless network. By inserting SIM 262 into mobile station 202, an end user can have access to any and all of his/her subscribed services. SIM 262 generally includes a processor and memory for storing information. Since SIM 262 is coupled to a SIM interface 264, it is coupled to microprocessor 238 through communication lines. In order to identify the subscriber, SIM 262 contains some user parameters such as an International Mobile Subscriber Identity (IMSI). An advantage of using SIM 262 is that end users are not necessarily bound by any single physical mobile station. SIM 262 may store additional user information for the mobile station as well, including datebook (or calendar) information and recent call information. It will be appreciated that mobile station 202 may also be used with any other type of network compatible mobile device 24 such as those being code division multiple access (CDMA) enabled and should not be limited to those using and/or having a SIM card 262.

Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 which controls overall operation of mobile station 202. Communication functions, including at least data and voice communications are performed through communication subsystem 211. Microprocessor 238 also interacts with additional device subsystems such as a display 222, a flash memory 224, a random access memory (RAM) 226, auxiliary input/output subsystems 228, a serial port 230, a keyboard 232, a speaker 234, a microphone 236, a short-range communications subsystem 240, and any other device subsystems generally designated at 242. Some of the subsystems shown in FIG. 3 perform communication-related functions, whereas other subsystems may provide "resident" or on-device functions. Notably, some subsystems such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 3 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 3 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 5:
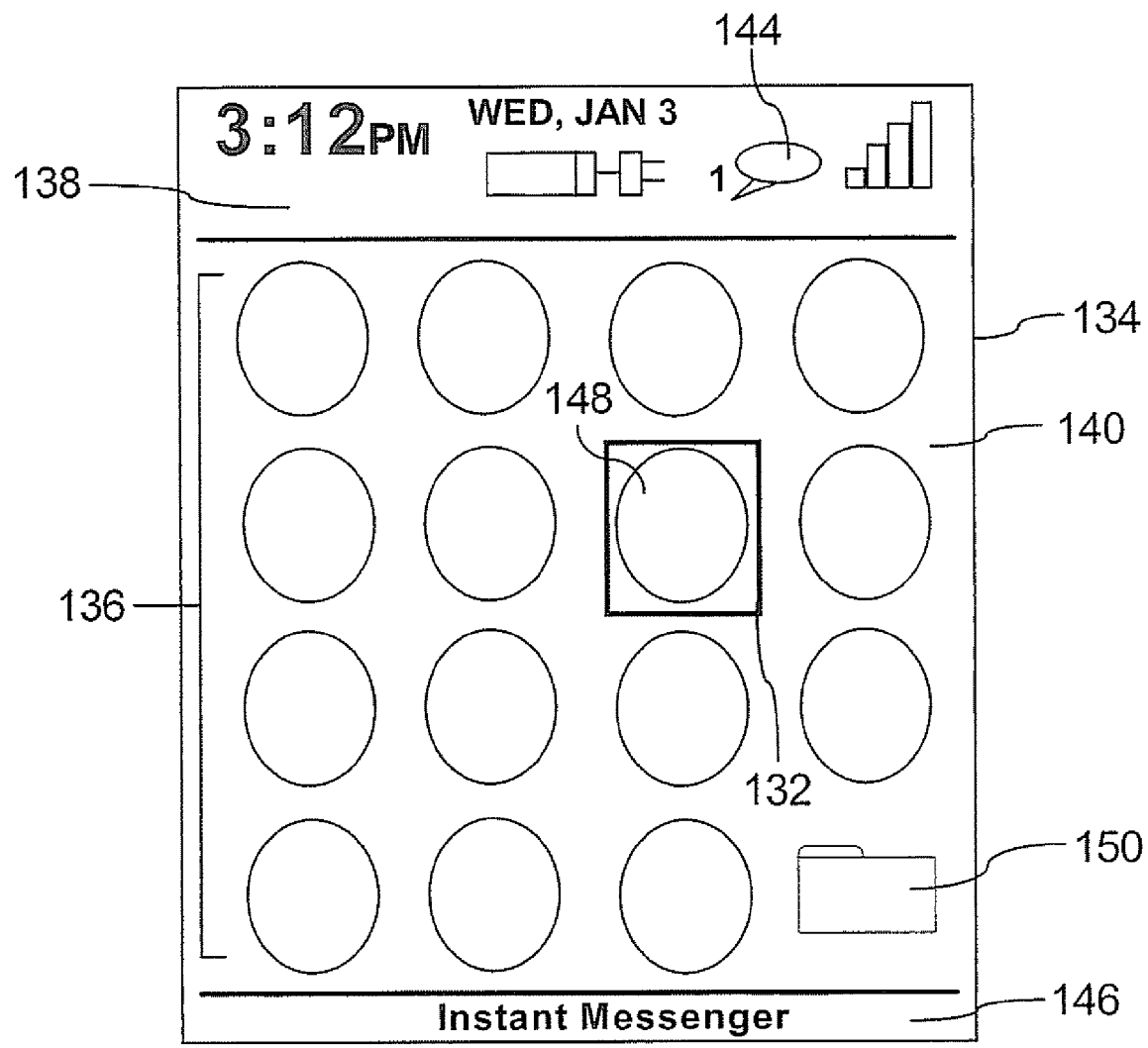
FIG. 5 is a screen shot of a home screen for the mobile device of any or both of FIGS. 1 and 2.

Turning now to FIG. 5, the mobile device 24 displays a home screen 134, which is preferably the active screen when the mobile device 24 is powered up and constitutes the main ribbon application. The home screen 134 generally comprises a status region 138 and a theme background 140, which provides a graphical background for the display 120. The theme background 140 displays a series of icons 136 in a predefined arrangement on a graphical background.

In some themes, the home screen 134 may limit the number icons 136 shown on the home screen 134 so as to not detract from the theme background 140, particularly where the background 140 is chosen for aesthetic reasons. The theme background 140 shown in FIG. 5 provides a grid of icons. In other themes (not shown), a limited list of icons may be displayed in a column (or row) on the home screen along one portion of the display 120. In yet another theme, the entire list of icons may be listed in a continuous row along one side of the home screen on the display 120 enabling the user to scroll through the list while maintaining a limited number of currently visible icons on the display 120. In yet another theme (not shown), metadata may be displayed with each of a limited number of icons shown on the home screen. For example, the next two appointments in the user's calendar may be accessed by the processor 238 and displayed next to the calendar icon. It will be appreciated that preferably several themes are available for the user to select and that any applicable arrangement may be used.

One or more of the series of icons 136 is typically a folder 150 that itself is capable of organizing any number of applications therewithin.

As can be seen in FIG. 5, the status region 138 in this embodiment comprises a date/time display, and signal strength and incoming message identifiers such as the instant messenger balloon 144 shown. The instant messenger balloon 144 indicates the presence of and number of incoming instant messages for active or new conversations. The theme background 140, in addition to a graphical background and the series of icons 136, also comprises a status bar 146. The status bar 146 provides information to the user based on the location of the selection cursor 132, e.g. by displaying a name for the icon 136 that is currently highlighted.

Movement, navigation, and/or scrolling with use of a cursor/view positioning device 122 (e.g. trackball 122b or scroll wheel 122a) is beneficial given the relatively large size of visually displayed information and the compact size of display 120, and since information and messages are typically only partially presented in the limited view of display 120 at any given moment. As previously described, positioning device 122—scroll wheel 122a and trackball 122b, are helpful cursor/view positioning mechanisms to achieve such movement. Positioning device 122, which may be referred to as a scroll wheel or scroll device 12a in one embodiment (FIG. 1), specifically includes a circular disc which is rotatable about a fixed axis of housing and may be rotated by the end user's index finger or thumb. As noted above, in another embodiment (FIG. 2) the trackball 122b comprises a multi-directional member that enables upward, downward and if desired, diagonal movements. The multi-directional movements afforded, in particular, by the trackball 122b and the presentation of the grid of icons 136 and folders 150 provides the user with flexibility and familiarity of the layout of a traditional desktop computer interface. Also, the positioning device 122 enables movement and selection operations to be executed on the mobile device 24 using one hand. The trackball 122b in particular also enables both one-handed use and the ability to cause the cursor 132 to traverse the display 120 in more than one direction.

Figure 4:
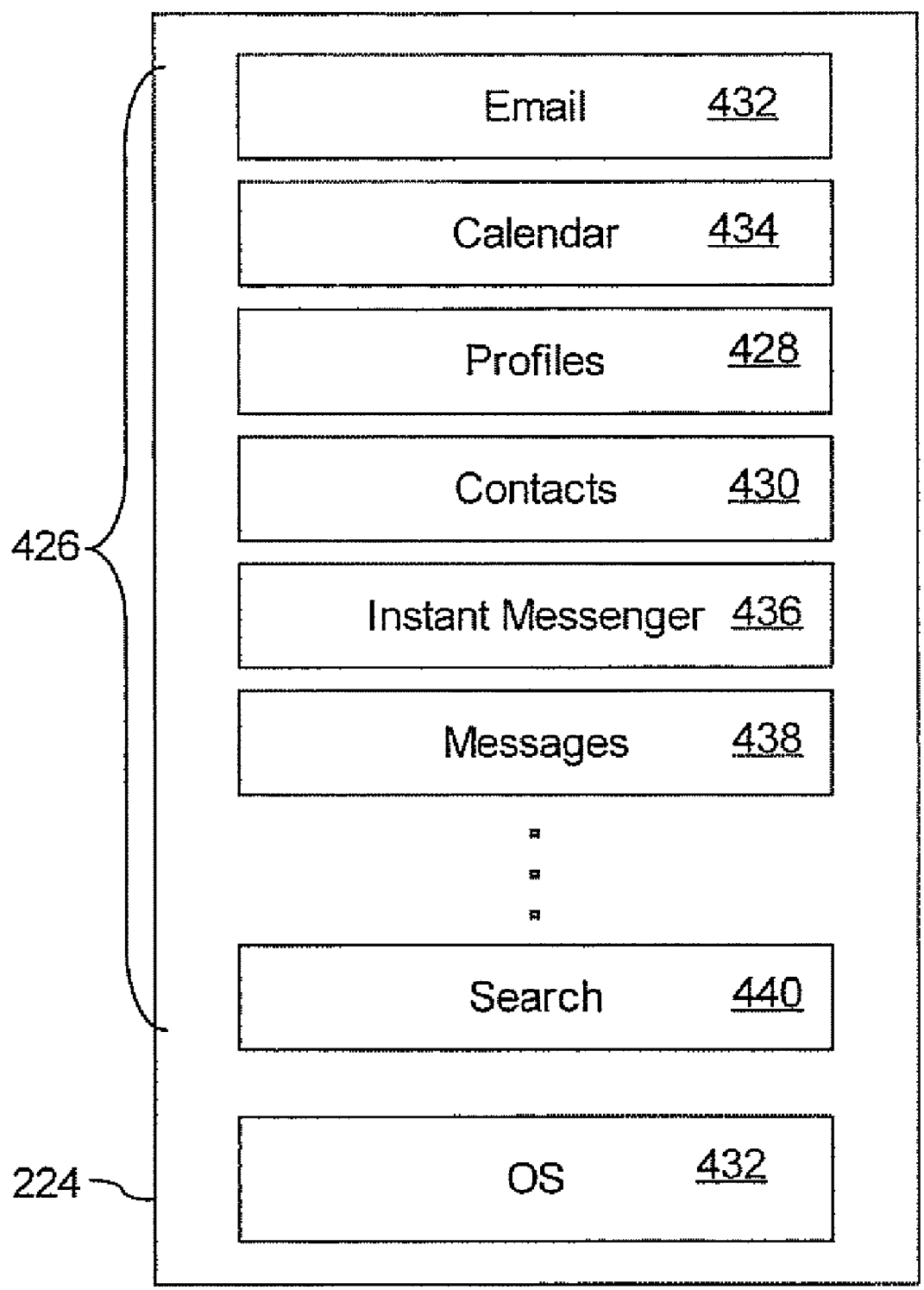
FIG. 4 is a schematic block diagram of the memory shown in FIG. 3.

As shown in FIG. 4, memory 224 includes a plurality of programs 426 associated with the series of icons 36 for the processing of data. Programs 426 may be any variety of forms such as, without limitation, software, firmware, and the like and include an application and any necessary memory allocation or pointers to associated memory. Programs 426 may include, for example, an instant messaging program 436, electronic mail (e-mail) 432, calendar program 434, profiles application 428, contacts 430, messages 438, search 440 etc. An operating system (OS) 432 also resides in memory 224. The mobile devices 24 of the present disclosure are also configured to enable communication between different ones of the programs/applications, e.g. between contacts program 430 and the email program 432 or instant messaging program 436. Also, the icons 136 for the applications on the devices 24 can be modified, named, moved, sorted and otherwise interacted with for the purposes of organizing and/or manipulating the visibility of the icons for those programs 426.

As an example, the instant messenger program 436 may be initiated (opened or viewed) from display 120 by highlighting an instant messenger icon 148 as shown in FIG. 5 using the positioning device 122 and providing a suitable user input to the mobile device 24, e.g. by pressing the trackball 122b.

Instant Messaging on Mobile Device

The mobile device 24 can be configured to be utilized for instant messaging or chat sessions, e.g., using a personal identification number (PIN) messaging system. It will be appreciated that the following principles may also be applied to a short message service (SMS) based messaging system or any other "instant" chat-type messaging services.

Figure 6:
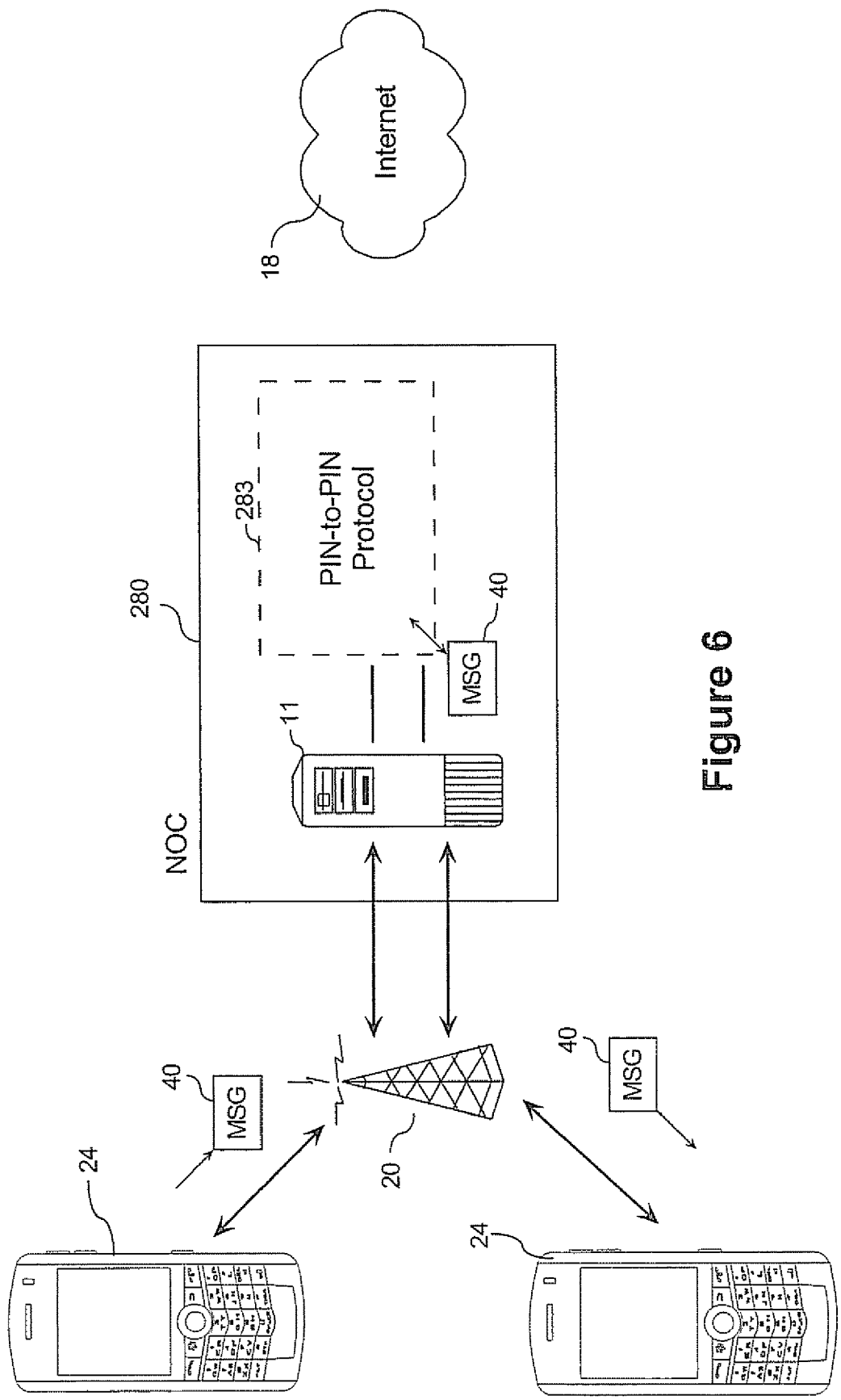
FIG. 6 is a system diagram showing an infrastructure for implementing an instant messaging protocol.

In the following embodiment shown in FIG. 6, a PIN-based messaging system is implemented using a server-based communication infrastructure, such as one that provides email, SMS, voice, Internet and other communications. In FIG. 6, a network operating centre (NOC) 280 facilitates instant messaging. Instant messaging is provided by an instant messaging program 436 stored on mobile device 24 which is initiated from the home screen 134 by highlighting and selecting the instant messaging icon 148. The NOC 280 relays messages between mobile devices 24 according to a PIN-to-PIN protocol 283.

An instant message is generally denoted by numeral 40 as shown in FIG. 6. As noted above, in this embodiment, the message 40 is a PIN-based message. In a PIN-based messaging protocol 283, each message 40 has associated therewith a PIN number corresponding to the mobile device 24 which has sent the message 40 and includes a destination PIN number identifying the intended recipient.

In general, in a PIN based messaging protocol 283, the sender of the message 40 knows the PIN of the intended recipient. This is preferably established when the two devices request to add each other to their respective contact or "buddy" lists. At the time of requesting new contacts, the two respective PIN numbers are exchanged via request e-mails which are preferably configured to be intercepted by the respective instant messaging applications 436 so as to not appeal in the message list or "inbox" of the user. Accordingly, the infrastructure shown in FIGS. 6-10 may be used as a transport medium to share PIN numbers between mobile devices 24, after which, the mobile devices 24 (having stored the PIN numbers for their contacts) are able to exchange instant messages in instant messaging sessions or conversations via a PIN-to-PIN protocol 283.

It can be appreciated that by using a message or email based method for provisioning the PIN numbers, the PIN numbers do not need to be revealed to other users and can be handled by the mobile devices 24 automatically. This also enables the instant messaging application 436 to update contact information immediately when the availability status of such information changes. This avoids the user having to update their contact lists manually.

Figure 11:
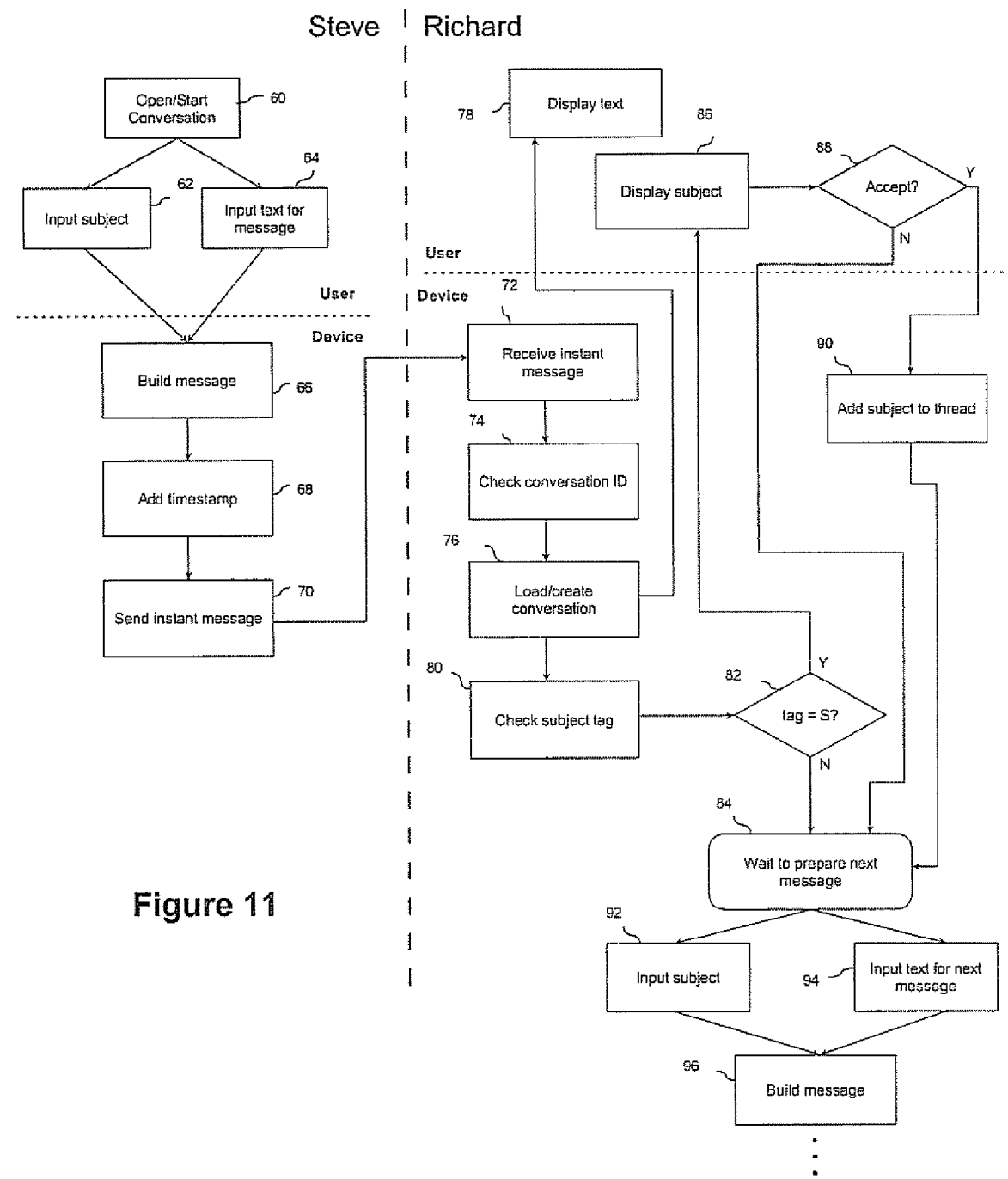
FIG. 11 is a flow diagram illustrating the preparation, transmission, receipt and examination shown in FIG. 10.

When conducting an instant messaging session according to the embodiment shown in FIG. 11, the mobile devices 24 can communicate directly with the NOC 280 in a client based exchange where, similar to other peer-to-peer programs, an intermediate server is not required. A message 40 sent by one mobile device 24 is received by the NOC 280, which obtains the PIN number for the intended recipient from a representation of the message 40 or from the message 40 itself. Upon obtaining the recipient's PIN number according to the PIN-to-PIN protocol 283, the NOC 280 then prepares a copy of the message 40 or relays the received message 40 to the recipient according to the mobile device 24 associated with such PIN number. The NOC 280 typically also provides a delivery confirmation to the original sender, which may or may not be displayed to the user. The NOC 280 also typically holds onto messages 282 and delivers them once the destination mobile device 24 is within a certain range (e.g. within its 'coverage') and is actually able to receive the message 40. The NOC 280 may choose to expire a message 40 if a certain waiting period lapses.

It will be appreciated that, as noted above, instant messaging can be implemented using any other suitable protocol such as SMS. In SMS, a message is transmitted to an SMC center (SMSC) within a carrier's infrastructure, and then delivered to the destination device. The SMSC would also be configured to hold onto messages and deliver then once the destination device is within coverage.

Figure 12:
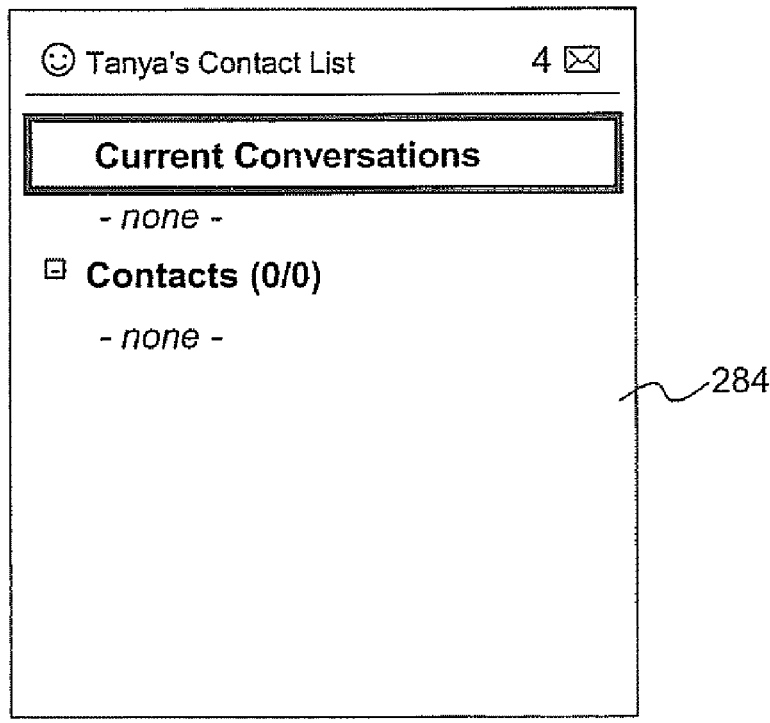
FIG. 12 is a screen shot of the home screen for an instant messaging application.
Figure 13:
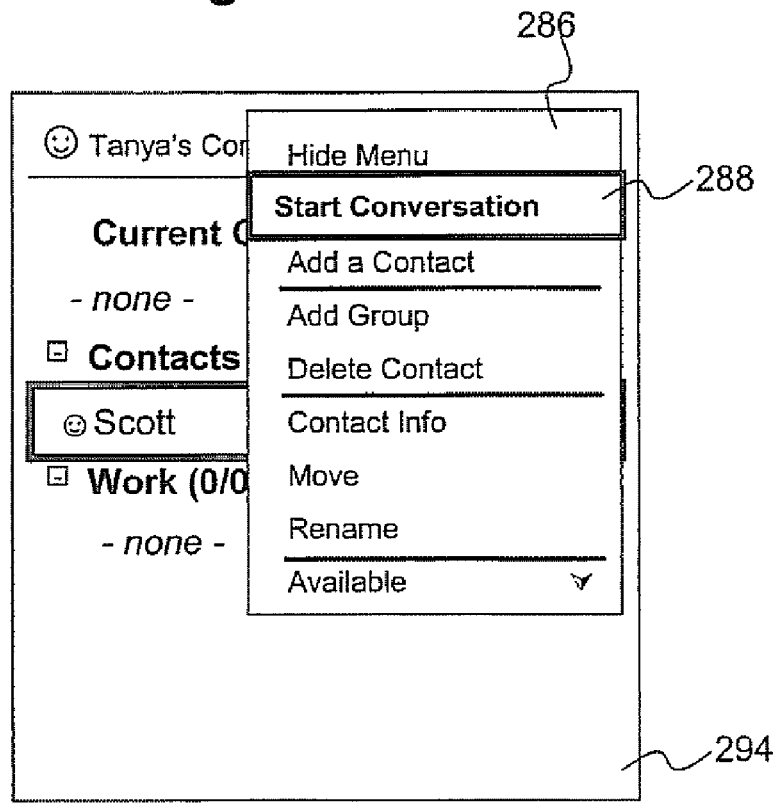
FIG. 13 is a screen shot showing a menu accessible from the instant messaging application of FIG. 12.

When initiating the instant messaging application 436, an instant messaging interface screen 284 such as that shown in FIG. 12 may then be displayed, which shows a list of current instant messaging sessions or conversations along with a list of the user's contacts. As can be seen in FIG. 13, a menu 286 can be initiated by activating a suitable input mechanism such as by selecting the trackball 122b or pressing the scrolling device 122a. The menu 286 comprises a "Start Conversation" option 288, which can be selected using the appropriate input device 122 to initiate or begin an instant messaging session or conversation. Once the session or conversation has begun, if the user decides to exit the conversation for a period of time, the conversation will be added to the conversation list.

Using Subjects for Instant Messaging Sessions

Previous instant messaging programs typically included the latest message in the instant messaging session as an identifier for the conversation. As discussed above, this is not necessarily representative of the nature, progression or status of the conversation. When a user has multiple conversations pending with the same user, confusion can arise and may require considerable effort by the user to locate a particular conversation let alone specific messages therein. To assist the user in identifying or recognizing specific conversations (or portions thereof) and to facilitate later retrieval of specific information with such conversations, the following embodiments incorporate one or more subjects or subject lines into the instant messaging session by adding and displaying a subject tag 302 in the instant messaging conversation as will be explained below.

In general, the subject is specified by one of the users in the conversation and, when specified, a proposed subject or update for the subject may optionally be distributed to other users in the conversation. The other users can preferably view the subject when received and have the choice of accepting, ignoring or modifying the proposed subject. In this way, the users in the conversation can use the subject suggested by one of the users, negotiate an agreement for a subject line, or can choose to specify their own distinct and/or personal subject for the session or portion thereof.

As noted above, an instant messaging session is facilitated by an instant messaging program 436 in each mobile device 24. Further detail of the instant messaging program 436 is shown in FIG. 7. As can be seen in FIG. 7, selection of a conversation identifier 34 (e.g. by the user from the instant messaging homescreen 284 on display 120) causes the processor 238 to initiate an instant messenger application 30 included in the instant messaging program 436. The conversation identifier 34 has associated therewith a conversation ID 38, which is typically linked to the ID 38 in the background. For the convenience of the user, as noted above, a subject identifier 36 is displayed with the conversation identifier 36.

The instant messaging program 436 also stores instant messaging (IM) session threads 32, which each also store a copy of a unique corresponding conversation ID 38 to enable the application 30 to access the specific thread 32 upon selection of the associated conversation identifier 34. Each thread 32 also preferably stores a copy of a subject 36 if applicable. As can be seen in FIG. 7, the program 436 stores a distinct thread 32 for each IM session, wherein the particular session can be accessed by the application 30 by con-elating a displayed conversation ID 38 with a conversation ID 38 stored with the thread 32.

Further detail of the IM session threads 32 is shown in FIG. 8. Each thread 32 is persisted in memory 224 (e.g. stored within program 436) and stores a series of messages 40 in chronological order. In this way, the application 30 can access the thread 32 and load into the display 120 each message in the session history. Subject 36 are stored by the thread 32 to enable the instant messaging application 30 to display the subject 36 with the associated conversation 34. As will be discussed below, more than one subject 36 may be associated with the conversation 34 and, as such, the multiple subjects 36 can be stored with the thread 32.

Further detail of an example of a structure for the messages 40 is shown in FIG. 9. Each message 40 generally comprises a body 42, which contains the text for the message 40, and a header 44, which contains various fields used for transmitted and processing each message 40. In this example, the header 44 includes a message type field 46 to specify the type of transmission (e.g. PIN, SMS etc.), a source field 48 to specify the device address for the sender, a destination field 50 to specify the device address for the intended recipient, a conversation ID field 52 to specify in which thread 32 the message 40 should be stored (i.e contains a copy of the conversation ID 38), a subject field 54 to enable the subject 36 to be transported with the message 40 (e.g. to create new subjects, modify subjects, notify others of subjects, etc.), and a timestamp field 58 to indicate the time (and if desired, the date) at which the message 40 was sent by the designated sender.

As shown in FIG. 9, the subject field 54, in addition to carrying a copy of the current or proposed subject 36, also includes a tag 56. The tag 56 can be used to indicate to the instant messaging application 30, upon receipt of a message 40, whether or not a subject 36 should be displayed, whether a new subject 36 is being transported, or simply whether or not subjects 36 are being used in the particular conversation 34. The tag 56 can have as many states as required to cover variations that are handled by the instant messaging application 30. For example (as used below), the tag 56 may display an "S" to indicate that a new subject 36 is being carried with the message 40 being processed to trigger a display of the subject 36 to the user to enable them to accept, ignore or reject the subject. An empty tag 56 may then indicate that no new subject 36 is being carried. Alternatively, the tag 56 could include three states, namely one for no subjects 36, a second indicating the current subject 36 with no changes, and a third indicating that a new subject 36 is being transported.

To transmit a new subject 36, when a new subject 36 is specified by a user, a message 40 with an empty body 42 can be sent with the subject field 54 populated. In this case, the tag 56 can be used to enable the instant messaging application 30 to recognize that the message 40 is a 'subject transport' message 40 rather than one that contributes to the conversation 34. Alternatively, the subject 36 could be added to the next message 40 that is sent by the user which defined the new subject 36 to save overhead. It can therefore be appreciated that incorporating a subject field 54 (preferably with a tag 56) into the message 40 enables many flexible alternatives for specifying, transporting and identifying the subject 36 for a particular thread 32.

Figure 10:
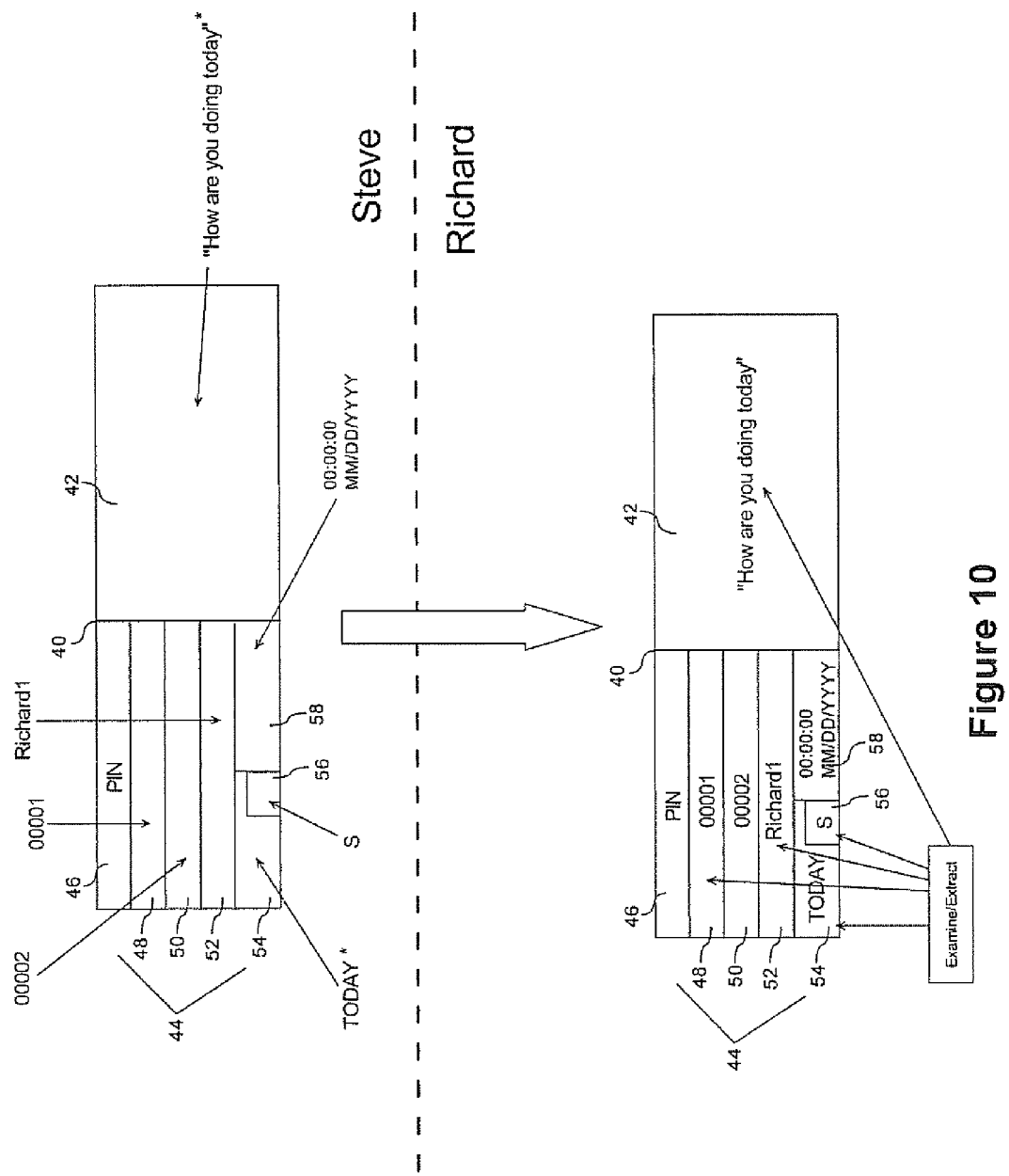
FIG. 10 is a block diagram illustrating preparation, transmission, receipt and examination of an instant message.

Turning now to FIG. 10, an empty message 40 being prepared by a user Steve's mobile device 24 is shown. Once a conversation thread 32 has been initiated, the transport type field 46 is preferably pre-populated as shown, since the transport type, e.g. PIN, is already known the application 30. However, it will be appreciated that if a conversation 34 is capable of comprising messages that are transported via multiple methods (e.g. to concatenate PIN and SMS messages into the same conversation 34) then the transport type field 46 would be populated at the time of preparing the message 40 for transmission according to the application 426 in which the message 40 is prepared. Similarly, the source field 48 can be pre-populated given that the message 40 is being prepared by a particular mobile device 24. In this example, Steve's mobile device 24 has a device address that equals 00001. According to the intended recipient, as indicated by the user during use of the instant messaging application 30, the destination field may be populated with the recipient mobile device's address. In this example, the intended recipient is Richard, whose mobile device 24 has a device address equal to 00002.

The conversation ID field 52 is populated by reading the conversation ID 38 from the thread 32 or the ID 38 associated with the conversation identifier 34. The subject field 54 is populated according to the way in which the instant messaging application 30 handles the transportation of subjects. In this example, a new subject is sent with the next message 40 and, when doing so, the tag 56 is set to "S". This enables Richard's mobile device 24 to identify when the subject field 54 should be read. The actual text to be sent to Richard is also added to the body 42. In this example, the message 40 being prepared by Steve is meant to say to Richard "How are you doing today". It will be appreciated that the header 44 can be populated while Steve is typing his message, or once Steve indicates that the message 40 is to be sent. Before sending the message to Richard, the processor 238 accesses the date/time program (not shown) internal to the mobile device 24, and adds the timestamp 58. As can be appreciated, the items marked with a "*" in FIG. 10 indicate user input.

The populated message 40, as received by Richard is shown in the bottom portion of FIG. 10. It can be seen that Richard's mobile device 24 can examine the various fields in the header 44 to determine the nature of the message (e.g. is a subject being sent?) and can associate the message 40 with the corresponding thread 32 (or open a new thread 32). The message 40 can be saved in chronological order using the timestamp 58.

Referring now to FIG. 11, a flow diagram of an example portion of an instant messaging session between Steve and Richard is shown. As can be seen in FIG. 11, on each side of the transmission, steps performed external to the device (user interactions) are separated from those that are performed internally by the processor 238 and instant messaging program 436.

At step 60, a new conversation is created or an existing one is opened by Steve, and steps 62 and 64 involve Steve specifying a subject 36 and typing in text for the message 40 respectively. Where the subject 36 is transported in an empty message 40, steps 62 and 64 are separate parallel operations. In this example, we will assume that Steve first specifies a subject 36 and then upon typing text for his next message 40, the subject 36 is transported with the next message 40. With the inputs from steps 62 and 64, the instant messaging application 30 can build the message 40 at step 66, e.g. as shown in FIG. 10. A timestamp 68 is added at step 68, and the instant message 40 is sent at step 70.

The message 40 is received by Richard's mobile device 24 at step 72. The instant messaging application 30 is then responsible for processing the message 40. The conversation ID 38 is first examined at step 74 and the currently stored threads 32 are examined to determine if the message 40 is associated with an existing conversation 34 or if a new conversation 34 should be created. In either case, at step 76, the conversation 34 is loaded/created and the text included in the body 42 is displayed to Richard at step 78. At the same time (or once the text has been displayed), the instant messaging application 30 examines the subject tag 56 at step 80 to determine the state of the subject field 54 at step 82. In this example, a new subject is being transmitted as indicated by the "S" state in the subject tag 56 and thus the new subject is displayed to Richard at step 86. If subjects 36 are not being used, or if the subject has not changed (i.e. tag not equal to S), at step 84, the instant messaging application 30 may wait for the next message to be received from Steve or typed by Richard. By displaying the new subject 36, Richard may be given the option to accept, reject or ignore the subject 36 at step 88. If Richard does not accept the subject, the instant messaging application 30 waits for the next message at step 84. If Richard does accept the new subject 36, the instant messaging application 30 adds the subject 36 to the thread 32 by both displaying the subject for Richard, and by storing a copy of the new subject in the program 436. The instant messaging application 30 then waits for the next message at step 84.

The beginning steps of the next message are also shown in FIG. 11. It can be seen that a new subject can be input at step 92 and text entered for the message 40 at step 94, similar to what was performed by Steve in steps 62 and 64. Richard's mobile device 24 may then build the message at step 96 and the process continues as above.

Figure 14A:
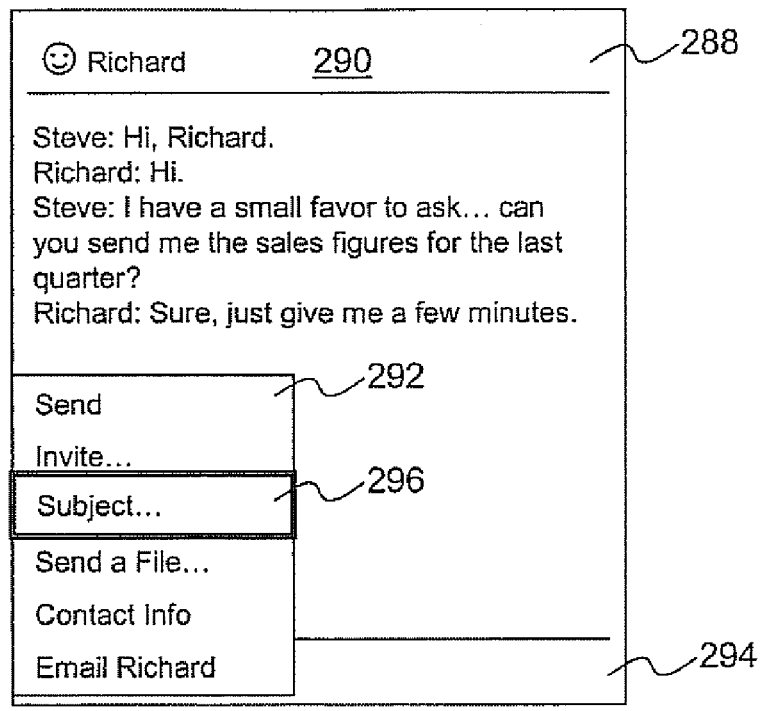
FIGS. 14(*a*) through 14(*j*) are a series of screen shots showing an instant messaging session identifying subjects therefor.

The use of a subject or subject line in an instant messaging session is illustrated using screen shots in FIGS. 14(a) through 14(j). FIG. 14(a) shows an in-progress instant messaging session taking place between a pair of users, Richard and Steve. The instant messaging session is displayed in a chat window 288 with a contact bar 290 showing the name of the contact that the user is currently corresponding with. FIG. 14(a) shows Steve's chat window 288 as he is chatting/corresponding with Richard.

At a desired point in the conversation or session, a subject can be specified. This can also be done at the beginning of the session, in which case, the subject is thereafter modified or "updated" to reflect the changing nature of the session or conversation. Multiple subjects can also be associated with a single conversation, each being added at specific locations in the conversation.

As can be seen in FIG. 14(a), while waiting for Richard to respond with sales figures, Steve specifies (i.e. enters) a subject to flag this particular portion of the conversation. To specify a subject, a session menu 292 is first initiated by selecting the appropriate input mechanism.

The session menu 292 comprises a number of options for the session, such as a "Send" feature, which sends the next message by capturing the text that has been entered into the entry box 294 (can also be done by pressing an enter key, trackball 122b etc.); an "Invite" feature to add other contacts to the conversation; a "Send a File" option to attach files to a message; a "Contact Info" option to view more information on, e.g. Richard; an "Email" option for initiating an email correspondence; and a "Subject" option 296.

The Subject option 296 can be selected to enable the user to enter a subject, topic or subject line identifying the session or at least a portion thereof. The subject is intended to be associated (e.g. displayed) with (or within) the session such that the user can later identify the nature of the conversation. As such, the subject may be displayed with the contact in the current conversations list (see FIGS. 12 and 13). When multiple subjects are included in the same message, each subject may be displayed with the conversation, the most recent conversation may be displayed, or any number of subjects according to user preferences. For example, a conversation having three subjects covered during the session may list all three subjects along the right hand portion of the display 120 with the contact(s) associated with the conversation. This would enable the user to at first glance determine in which conversation a specific topic or subject was covered.

Due to the limited space available on a mobile device 24, the instant messaging application 436 may be configured to display only the most recent subject or a maximum number of the most recent subjects in the conversation. If limited, the user may then simply select, enter or highlight the conversation to view the remaining subjects. It will be appreciated that the subject or topic associated with an instant messaging session may be displayed in many ways with the associated contact. For example, the time at which the subject was created can be specified with the subject label. In this way, the user can distinguish between different conversations having the same subject. The subjects could also be displayed as a list whereby the user could select a particular subject to expand into a view of the conversation (or portion thereof) corresponding to that subject (i.e. similar to a collapsible view in desktop explorer applications).

Figure 14B:
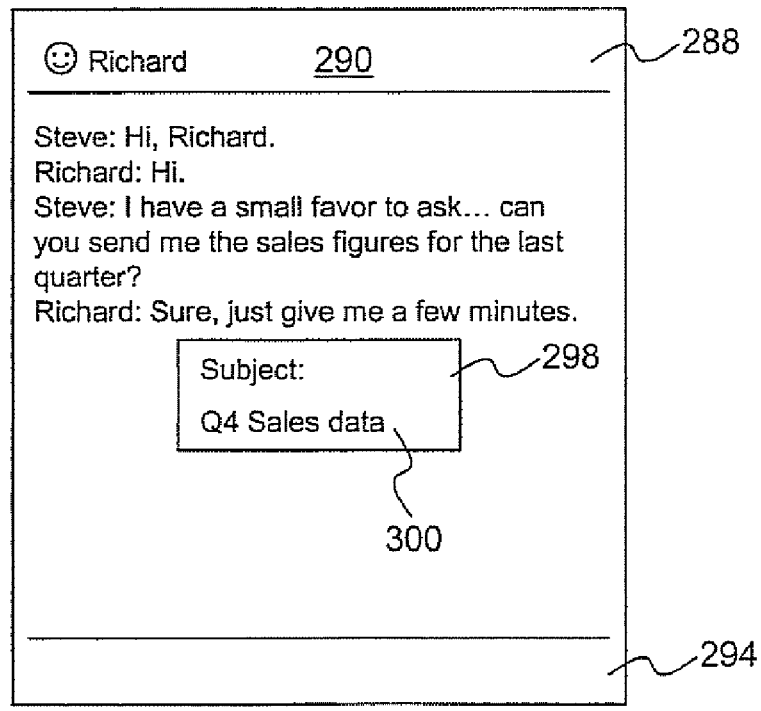
Figure 14C:
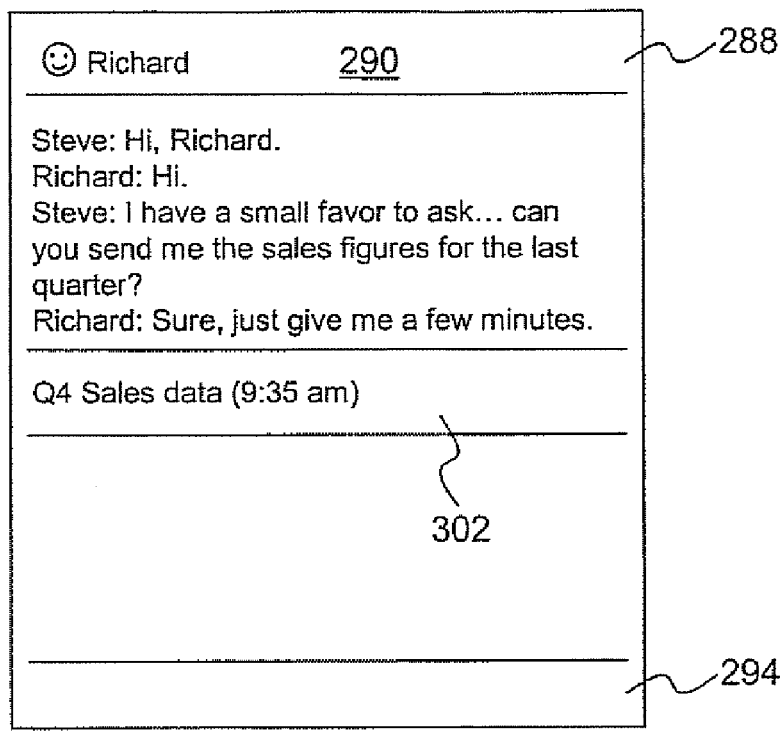

As can be seen in FIG. 14(b), by selecting the Subject option 296, a subject entry window 298 may then be displayed within the session. The entry window 298 shown in FIG. 14(b) comprises a text entry box 300 to enable the user to enter a string of characters to identify the appropriate subject. The user may then add the subject by selecting the appropriate input mechanism whereby a subject tag 302 is added to the session at the current point in the conversation as seen in FIG. 14(c).

Figure 14D:
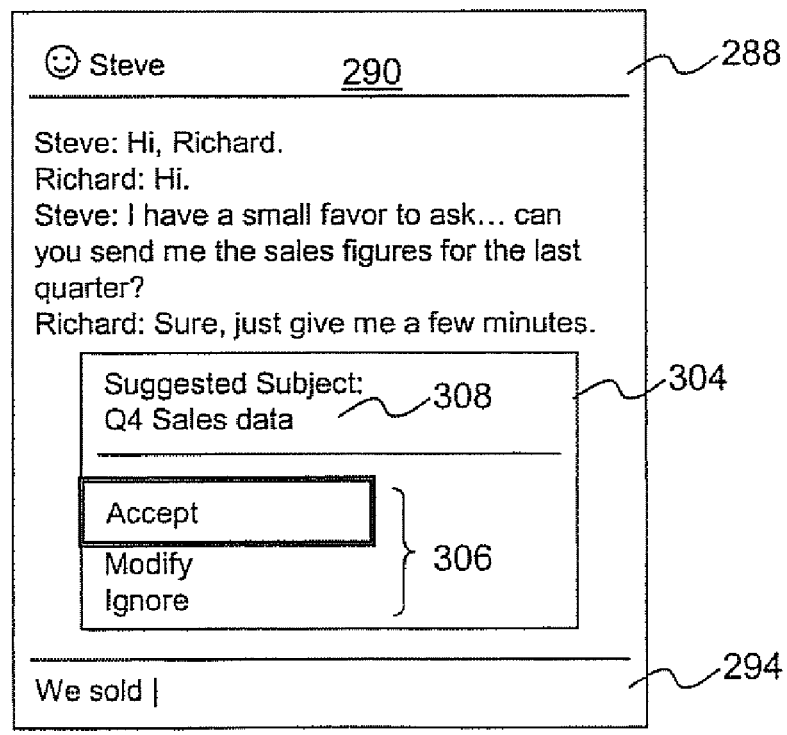
Figure 14E:
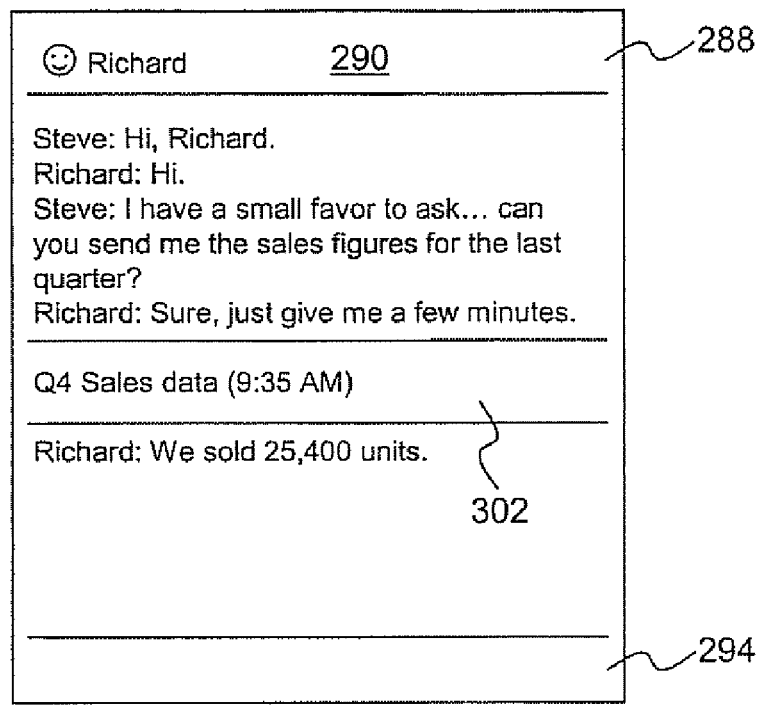

FIG. 14(d) shows Richard's chat window 288. The subject specified by Steve may be automatically designated as the subject for the session as a default, or the mobile devices 24 may require that Richard also accept the subject. As such, in one embodiment, the subject specified by Steve may be first considered a "Suggested Subject" until approved by Richard. In this scenario, once Steve has specified the subject "Q4 Sales data", a suggested subject window 304 is displayed within Richard's chat window 288 as shown in FIG. 14(d). The suggested subject window 304 comprises a copy of the subject specified by Steve in header 308, and may provide a selection portion 306. In this example, Richard may accept, modify or ignore (deny) the subject identifier. If Richard ignores or denies the subject, the subject tag 302 is not added to his chat window 288. However, if Richard accepts the suggested subject, the subject tag 302 is added to his session, similar to on Steve's device as shown in FIGS. 14(c) and 14(e).

If Richard decides to modify the subject, a similar subject window 298 may be displayed to enable Richard to enter his desired modification. The window 298 may be displayed with the already specified subject or may include a blank entry box 300. In one embodiment, a modification by Richard will only change the look of his subject tag 302. In another embodiment, once Richard creates a modified subject, his mobile device 24 may then send his suggested modified subject back to Steve where negotiation of an agreed upon subject can take place. As such, modification of the subject can be symmetric or asymmetric such and negotiation of a subject is only a optional feature that may be included or be capable of being suppressed as desired. It can therefore be seen that the subject can be modified and adapted by each correspondent in the instant messaging session such that all parties can understand the subject to give the subject a personal meaning if desired. It will also be appreciated that for asymmetric subject specification, a subject update does not need to be sent to the other users and thus such an update is optional.

The subject or subject line specified by the user is now integrated into the instant messaging session. At the originating user, the subject tag 302 is embedded into the conversation at the point of being created. Alternatively, the subject may be inserted as a header in the chat window 288 or any other suitable location on the display 120 such that the user can readily ascertain the subject. In order to update the subject at the other user, the subject can be attached to a PIN message or be embodied as meta-data in the header field and may be given a special code in the message to identify it as a subject. In this way, the subject can be attached to and sent with the next message being sent to the other user. In another embodiment, the subject can be created and sent as a separate and distinct PIN message with a code or other information identifying it as a subject (e.g. in a header). At the other user's mobile device 24, the instant messaging application 436 determines the content of the subject or subject line based on the code or other identifying information and then creates a subject tag 302 if the other user accepts or modifies the proposed subject. In this embodiment, the subject is inserted into the conversation as a new message but is given a unique appearance to distinguish it as a subject rather than a message. For example, the subject tag 202 may be given a border, time stamp and be user independent (e.g. not labelled with "Steve:" or "Richard:") as shown in FIGS. 14(c), (e) and (j).

Figure 14F:
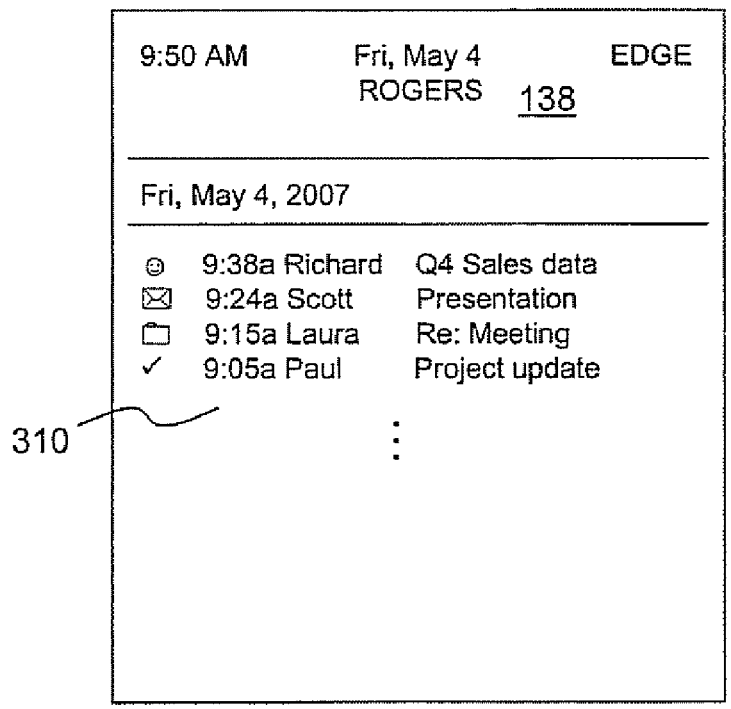
Figure 14G:
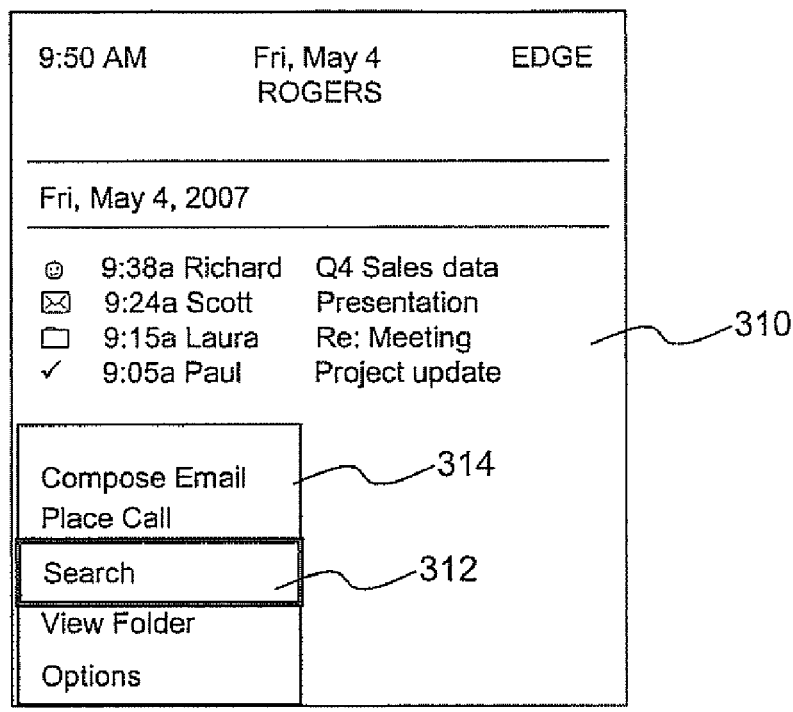

As can be seen in FIG. 14(f), current instant messaging sessions can be listed in an inbox or message list 310 similar to an email (outgoing or incoming) or text message. By specifying a subject, Steve can, at first glance, determine that the conversation with Richard covers at least in part, the Q4 sales figures. Since the conversation is listed in the message list 310, a search option 312 that already exists for searching within the message list 310 can be utilized by selecting the search option 312 from a message list menu 314 using appropriate input mechanisms as seen in FIG. 14(g).

Figure 14H:
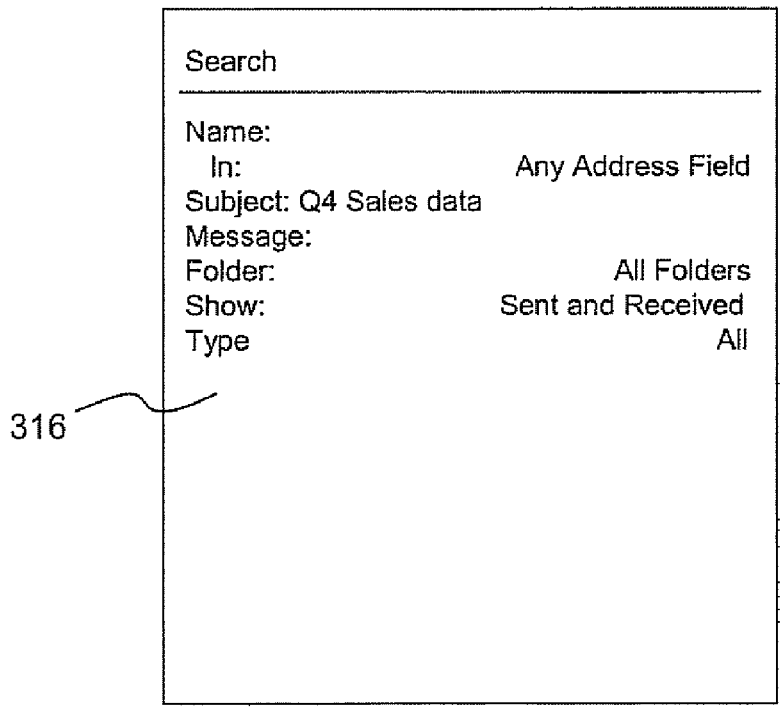
Figure 14I:
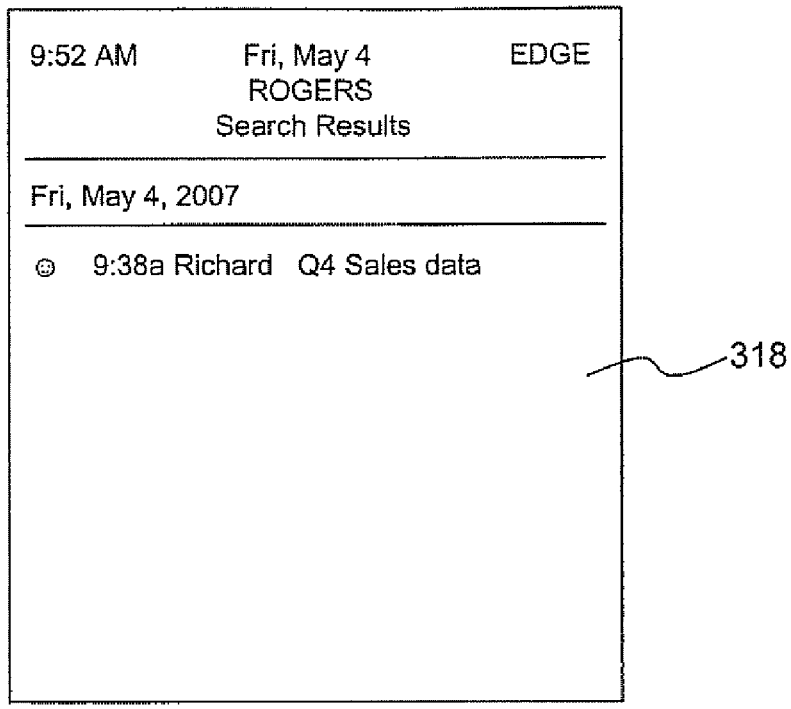

By selecting the search option 312, a search window 316 may then be displayed as seen in FIG. 14(h), which enables the user (e.g. Steve) to specify a subject. If the user wishes to search for a portion of an instant messaging session, they can search according to subject, e.g. by entering "Q4 Sales data". As can be seen in FIG. 14(i), a search results screen 318 is then displayed listing those messages, conversations etc. including the specified subject. In this way, the user can search through conversations in the same way that they search for subjects in an email thereby utilizing existing searching capabilities.

Figure 14J:
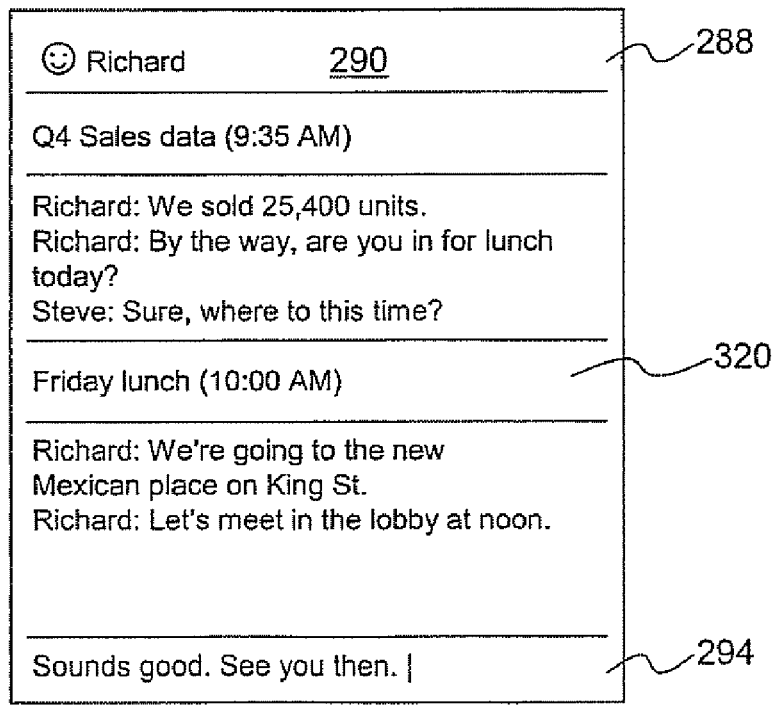

As noted above, an instant messaging session may include multiple subjects within the same conversation. Turning now to FIG. 14(j), a second subject tag 320, in this example for "Friday lunch", can be inserted into the same session. By specifying multiple subjects, the user can distinguish between multiple topics covered during the same conversation. In this way, if Steve wishes to simply continue on chatting with Richard without stalling a new conversation, Steve may instead specify/suggest a new subject to begin a new topic. This enables further flexibility whereby Steve may wish to only have one active conversation with each contact. This way, Steve only needs to specify a new subject at each session while maintaining the previous conversation history. Moreover, if the mobile device 24 restricts the number of active conversations with the same party, the multiple subjects can allow the user to keep the conversation history without having to create a new session. It can be appreciated that the instant messaging application 436 can also be configured such that whereupon specifying a new subject for a conversation, a new conversation thread is created such that there are now two references to distinct conversations, each having their own subjects and both being searchable.

As also noted above, the most recent subject can be displayed with the conversation in the message list 310, or multiple subjects may instead be displayed.

It can therefore be seen that instant messaging sessions can be better organized and identified by using at least one subject therein. The instant messaging sessions may then be displayed along with the subject to enable the user at first glance to ascertain some information about the topics or subjects covered in the session and/or to use existing searching capabilities for other types of messages stored on the mobile device 24. A subject can be specified by one user and be sent as a suggested subject to the other users in the conversation. The other users may then be given the opportunity to accept or ignore the subject tag 302 or modify the subject to reflect something more meaningful to them. Alternatively, the suggested subject can trigger a negotiation between the users to agree upon a common subject if so desired.

It will be appreciated that the above principles regarding the utilization of subjects in an instant messaging application 436 should not be limited to only PIN-to-PIN protocols but may also be applied to SMS messages addressed to the phone number of the user's mobile device 24. Similarly, the subject tags 302 can also be implemented with third party instant messaging applications compatible with the mobile device 24 such as Yahoo!® messenger etc. to enable the user to also use existing messaging communities that are not directly hosted by the NOC 280. To implement the subjects with a third party messaging application, separate messages containing the subject can be created at the mobile device 24 that can be identified by another mobile device 24 as being a subject rather than a message. In this way, the subject can be displayed as such at the other mobile device 24.

It will also be appreciated that the particular options, outcomes, applications, screen shots and icons shown in the figures and described above are for illustrative purposes only and many other variations can be used to implement the principles described above.

Although the above has been described with reference to certain specific embodiments, various modifications thereof will be apparent to those skilled in the art as outlined in the appended claims.

The invention claimed is:

1. A method for identifying instant messaging conversations on a mobile device, said method comprising:
providing an interface for exchanging instant messages for a thread comprising an instant messaging conversation, said thread comprising a plurality of said instant messages;
providing an option to enable definition of subjects for portions of said thread;
upon receiving a first input entering a first subject, displaying said first subject at a first current point in said thread along with said instant messages;
receiving one or more additional inputs entering one or more additional subjects;
displaying said additional subjects at corresponding current points in said thread to identify different portions of said thread within said instant messaging conversation; and
each subject is transmitted in said thread as a separate instant message having an identifier for distinguishing said separate instant message as comprising said subject to enable a correspondent device to display said subject with said instant messaging conversation.

2. The method according to claim 1 comprising associating said subjects with said instant messaging conversation on said mobile device to enable at least one of a search for content in said instant messaging conversation and a search for a desired instant messaging conversation according to said subjects.

3. The method according to claim 1 wherein said instant message comprises a header and a body, said header including a subject field for specifying said subjects, said body for containing text associated with said instant message.

4. The method according to claim 1 comprising providing one or more other messages to a correspondent device in said instant messaging conversation identifying any one or more of said additional subjects.

5. The method according to claim 1 using a personal identification number (PIN) based instant messaging protocol.

6. The method according to claim 1 comprising enabling said first subject to be at least one of accepted, ignored and modified.

7. The method according to claim 1 comprising:
receiving said message identifying said first subject; and
displaying said first subject with a corresponding portion of said instant messaging thread on said correspondent device.

8. The method according to claim 7 comprising enabling said identified first subject to be at least one of accepted, ignored and modified.

9. A method for updating instant messaging subjects in an instant messaging conversation on a mobile device, said method comprising:
receiving a message at said mobile device from a correspondent device in an existing thread comprising said instant messaging conversation with said correspondent device, said thread comprising a plurality of instant messages, said message identifying a first subject for a first portion of said thread;
displaying said first subject with a corresponding portion of said thread on said mobile device;
adding said first subject at a first current point in the thread along with the instant messages;
receiving one or more additional messages identifying one or more additional subjects;
displaying said additional subjects with corresponding portions of said thread on said mobile device;
adding said additional subjects at corresponding current points in said thread to identify different portions of said thread within said instant messaging conversation; and
wherein each subject is transmitted in said instant messaging conversation as a separate instant message having an identifier for distinguishing said separate instant message as relating to said first subject to enable said mobile device to display said first subject within said thread at said current point.

10. The method according to claim 9 comprising enabling said first subject to be one of accepted, ignored and modified.

11. The method according to claim 9 comprising enabling one or more additional subjects to be one of accepted, ignored and modified.

12. The method according to claim 9 using a personal identification number (PIN) based instant messaging protocol.

13. A mobile device comprising:
a display including an interface to exchange instant messages for a thread comprising an instant messaging conversation, said thread comprising a plurality of said instant messages;
an input mechanism to define subjects for portions of said thread;

a processor, electrically coupled to said display and said input mechanism; and a memory, electronically coupled to said processor, said memory including executable instructions for causing said processor to:
upon receiving a first input entering a first subject, display said first subject at a first current point in said thread along with said instant messages;
upon receiving on or more additional inputs, enter one or more additional subjects;
display said additional subjects at corresponding current points in said thread to identify different portions of said thread within said instant messaging conversation; and
wherein said processor is configured for transmitting each subject in said thread as a separate instant message having an identifier for distinguishing said separate instant message as relating to said first subject to enable a correspondent device to display said first subject with said instant messaging conversation.

14. The mobile device according to claim 13 wherein said executable instructions comprise instructions for associating said first subject with said instant messaging conversation on said mobile device to enable at least one of a search for content in said instant messaging conversation and a search for a desired instant messaging conversation according to said first subject.

15. The mobile device according to claim 13 wherein said executable instructions comprise instructions for having said mobile device send one or more other messages to said correspondent device in said instant messaging conversation identifying one or more of said additional subjects.

16. The mobile device according to claim 13 using a personal identification number (PIN) based instant messaging protocol to exchange said instant messages.

17. The mobile device according to claim 13 wherein said instant message comprises a header and a body, said header including a subject field specifying said first subject, said body containing text associated with said instant message.

18. A mobile device comprising:
a display including an interface to exchange instant messages in an existing thread comprising an instant messaging conversation with a correspondent device, said thread comprising a plurality of instant messages;
a processor, electrically coupled to said display; and
a memory, electrically coupled to said processor, said memory including executable instructions for causing said processor to cause said device to:
upon receiving a message at said mobile device from said correspondent device in said existing thread, said message identifying a first subject for a first portion of said thread, display said first subject with a corresponding portion of said thread on said mobile device;
add said subject at a first current point in said thread along with said instant messages;
receive one or more additional messages identifying one or more additional subjects;
display said additional subjects with corresponding portions of said thread on said mobile device;
add said additional subjects at corresponding current points in said thread to identify different portions of said thread within said instant messaging conversation; and
wherein each subject is transmitted in said instant messaging conversation as a separate instant message having an identifier for distinguishing said separate instant message as relating to said subject to enable said mobile device to display said first subject within said thread at said current point.

19. The device according to claim 18 comprising enabling said first subject to be at least one of accepted, ignored and modified.

20. The device according to claim 18 using a personal identification number (PIN) based protocol to exchange said instant messages.

* * * * *

UNITED STATES PATENT AND TRADEMARK OFFICE
CERTIFICATE OF CORRECTION

| | | |
|---|---|---|
| PATENT NO. | : 7,885,641 B2 | |
| APPLICATION NO. | : 11/764544 | |
| DATED | : February 8, 2011 | |
| INVENTOR(S) | : Piotr Konrad Tysowski | |

It is certified that error appears in the above-identified patent and that said Letters Patent is hereby corrected as shown below:

In column 15, line 63, delete "each subject is transmitted in said thread", and replace with --transmitting each subject in said thread--.

In column 16, line 47 and 48, delete "wherein each subject is transmitted in said instant messaging conversation", and replace with --transmitting each subject in said instant messaging conversation--.

In column 17, line 8, delete "on or more", and replace with --one or more--.

In column 17, line 14, delete "wherein said processor" and replace with --said processor--.

In column 18, line 24, delete "wherein each subject is transmitted", and replace with --each subject is transmitted--.

Signed and Sealed this
Third Day of April, 2012

David J. Kappos
*Director of the United States Patent and Trademark Office*